US010340694B2

(12) United States Patent
Rozman et al.

(10) Patent No.: US 10,340,694 B2
(45) Date of Patent: Jul. 2, 2019

(54) HYBRID TACTICAL QUIET GENERATOR

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 130 days.

(21) Appl. No.: 15/790,944

(22) Filed: Oct. 23, 2017

(65) Prior Publication Data

US 2019/0123560 A1 Apr. 25, 2019

(51) Int. Cl.
*H02J 3/32* (2006.01)

(52) U.S. Cl.
CPC ..................... *H02J 3/32* (2013.01)

(58) Field of Classification Search
CPC ................... B60L 1/003; H02J 3/32
See application file for complete search history.

(56) References Cited

U.S. PATENT DOCUMENTS

| 7,952,225 | B2 | 5/2011 | Reichard et al. |
| 2009/0228149 | A1 | 9/2009 | Alston |
| 2018/0015831 | A1* | 1/2018 | Rozman .................. B60L 1/003 |

* cited by examiner

Primary Examiner — Robert L Deberadinis
(74) Attorney, Agent, or Firm — Snell & Wilmer, L.L.P.

(57) ABSTRACT

An Output Supply System (OSS) may comprise an Electric Power Generating System (EPGS) comprising a first Permanent Magnet Synchronous Machine (PMSM), a first three-phase multifunction converter, a first three-position switch, a battery management system, wherein the PMSM, the first three-phase multifunction converter, the first three-position switch, and the battery management system are in electronic communication, and a first tangible, non-transitory memory configured to communicate with a first controller, the first tangible, non-transitory memory having instructions stored thereon that, in response to execution by the first controller, cause the first controller to perform operations.

20 Claims, 3 Drawing Sheets

HYBRID TACTICAL QUIET GENERATOR

FIELD

The disclosure generally relates to electrical power systems, and more particularly to the design of a control system for electrical power generating systems.

BACKGROUND

A generator may comprise an engine coupled to a permanent magnet generator (PMG) and may be used to generate electric power for an electronic power system. A PMG typically includes a stator winding and a rotor winding to generate a single three-phase voltage. The PMG output frequency is controlled by the engine's speed.

SUMMARY

In various embodiments, an Output Supply System (OSS) is provided. The OSS may comprise an Electric Power Generating System (EPGS), comprising a first Permanent Magnet Synchronous Machine (PMSM), a first three-phase multifunction converter, a first three-position switch, a battery management system, wherein the PMSM, the first three-phase multifunction converter, the first three-position switch, and the battery management system are in electronic communication, and a first tangible, non-transitory memory configured to communicate with a first controller, the first tangible, non-transitory memory having instructions stored thereon that, in response to execution by the first controller, cause the first controller to perform operations comprising: receiving, by the first controller, at least one of an input from a first sensor or a first parameter, determining, by the first controller, a second parameter based on the input of the first sensor, selecting, by the first controller, a first configuration of the first three-phase multifunction converter and a position of the first three-position switch in response to at least one of the first parameter or the second parameter, and commanding, by the first controller, the first three-position switch to one of a first position, a second position, or a third position and commanding the first configuration of the first three-phase multifunction converter.

In various embodiments, the second parameter is at least one of a change in voltage, a change in current, a change in temperature, a change in a shaft speed, or a battery capacity. In various embodiments, the first configuration of the first three-phase multifunction converter is one of a pulse width modulated (PWM) inverter, a PWM converter, or a dc/dc converter. In various embodiments, the first three-position switch is coupled to a neutral of the first PMSM. In various embodiments, the first controller further comprises a gate drive. In various embodiments, the OSS further comprises a Power Management and Distribution System (PMAD) in electronic communication with the EPGS, the PMAD comprising: a second three-phase multifunction converter, a second three-position switch, a PQ filter, a supercapacitor bank, wherein the second three-phase multifunction converter, the second three-position switch, the PQ filter, and the supercapacitor bank are in electronic communication, and a second tangible, non-transitory memory configured to communicate with a second controller, the second tangible, non-transitory memory having instructions stored thereon that, in response to execution by the second controller, cause the second controller to perform operations comprising: receiving, by the second controller, at least one of an input from a second sensor or the first parameter, determining, by the second controller, a third parameter based on the input of the second sensor, selecting, by the second controller, a second configuration of the second three-phase multifunction converter and a position of the second three-position switch in response to at least one of the first parameter or the third parameter, and commanding, by the second controller, the second three-position switch to at least one of a first position, a second position, or a third position and commanding the second configuration of the first three-phase multifunction converter. In various embodiments, the PMAD is in electronic communication with one of an AC power load, a load, a DC microgrid, or an Environmental Conditioning System (ECS) compressor load. In various embodiments, the ECS compressor load comprises a second PMSM. In various embodiments, the second three-position switch is coupled to a neutral of the second PMSM. In various embodiments, the third parameter is one of a change in voltage, a change in current, a change in temperature, a change in a shaft speed, a supercapacitor capacity, or a load. In various embodiments, the first parameter is an output from one of the first controller, the second controller, or a third controller. In various embodiments, the second configuration of the second three-phase multifunction converter is one of a PWM inverter, a PWM converter, or a dc/dc converter.

In various embodiments, a Tactical Quiet Generator (TQG) is provided. The TQG may comprise an engine having an output shaft, a TQG controller, and an Output Supply System (OSS) in electronic communication with the TQG controller comprising: an EPGS comprising; a first PMSM coupled to the output shaft, a first three-phase multifunction converter, a first three-position switch, and a battery management system, wherein the first PMSM, the first three-phase multifunction converter, first three-position switch, and the battery management system are in electronic communication; a PMAD comprising; a second three-phase multifunction converter, a second three-position switch, a PQ filter, and a supercapacitor bank, wherein the second three-phase multifunction converter, the second three-position switch, the PQ filter, and the supercapacitor bank are in electronic communication; and a tangible, non-transitory memory configured to communicate with an OSS controller, the tangible, non-transitory memory having instructions stored thereon that, in response to execution by the OSS controller, cause the OSS controller to perform operations comprising receiving, by the OSS controller, at least one of an input from a first sensor or a first parameter, determining, by the OSS controller, a second parameter based on the input of the first sensor, selecting, by the OSS controller, a first configuration of the first three-phase multifunction converter and a position of the first three-position switch in response to at least one of the first parameter or the second parameter, and commanding, by the OSS controller, the first three-position switch to at least one of a first position, a second position, or a third position and commanding the first configuration of the first three-phase multifunction converter.

In various embodiments, the operations further comprise selecting, by the OSS controller, a second configuration of the second three-phase multifunction converter and a position of the second three-position switch in response to one of the first parameter or the second parameter; and commanding, by the OSS controller, the second three-position switch to at least one of a first position, a second position, or a third position and commanding the second configuration of the second three-phase multifunction converter. In various embodiments, the second parameter is at least one of a change in voltage, a change in current, a change in temperature, a change in a shaft speed, a supercapacitor capacity, a battery capacity, or a load. In various embodiments, the first parameter is an output from at least one of the TQG controller or a third controller. In various embodiments, an operational mode of the OSS is determined in response to the commanding, by the OSS controller, the first three-position switch to at least one of a first position, a second position, or a third position and commanding the first configuration of the first three-phase multifunction converter and the commanding, by the OSS controller, the second three-position switch to at least one of a first position, a second position, or a third position and commanding the second configuration of the second three-phase multifunction converter. In various embodiments, the operational mode of the OSS is at least one of an engine start or engine assist mode, an active rectification mode, a silent mode, a first DC bus stabilization mode, a second DC bus stabilization mode, a third DC bus stabilization mode, an ECS power supply mode, a DC microgrid power supply mode, or an AC power supply mode.

In various embodiments, an article of manufacture is provided. The article of manufacture may include a tangible, non-transitory computer-readable storage medium having instructions stored thereon that, in response to execution by a processor, cause the processor to perform operations comprising: receiving, by the processor, at least one of an input from a first sensor or a first parameter, determining, by the processor, a second parameter based on the input of the first sensor, selecting, by the processor, a first configuration of a first three-phase multifunction converter and a position of a first three-position switch in response to at least one of the first parameter or the second parameter, and commanding, by the processor, the first three-position switch to at least one of a first position, a second position, or a third position and commanding the first configuration of the first three-phase multifunction converter.

In various embodiments the article of manufacture may further comprise the operation of selecting, by the processor, a second configuration of a second three-phase multifunction converter and a position of a second three-position switch in response to at least one of the first parameter or the second parameter and commanding, by the processor, the second three-position switch to at least one of a first position, a second position, or a third position and commanding the second configuration of the second three-phase multifunction converter.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
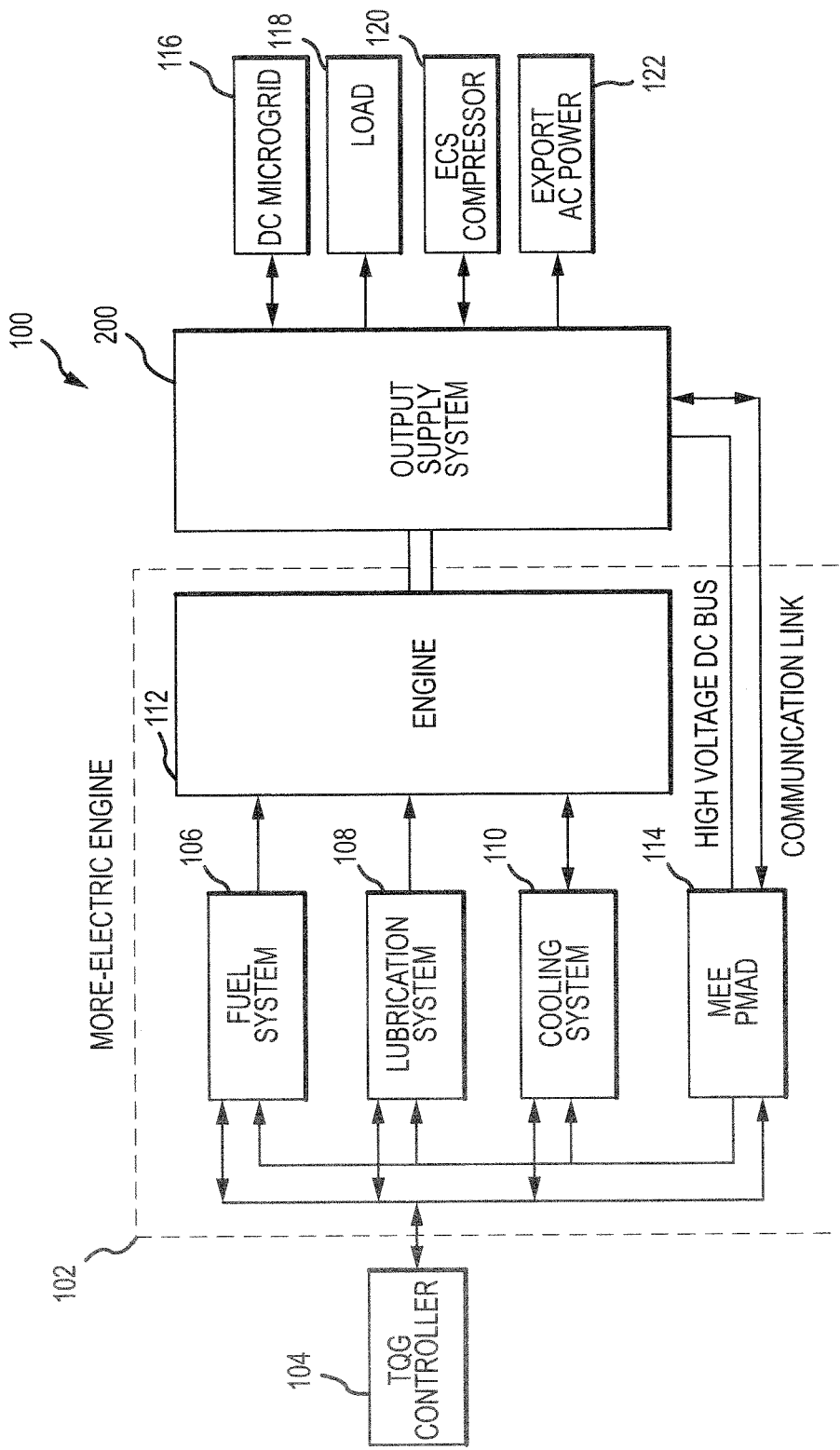
FIG. 1 illustrates a schematic view of a Tactical Quiet Generator, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

In various embodiments, PMGs of the present disclosure make use of multiple stator armature windings disposed in a single stator. Rectifiers are electrically coupled to the PMG for each respective stator armature winding. As a result, a plurality of outputs is connected in series to generate HVDC power. The output voltage of a PMG is directly proportional to the rotational velocity of the rotor and, in this regard, a PMG may be coupled to an engine output shaft. Active rectifiers may be configured to control a voltage at the active rectifier output to a desired value regardless of a PMG rotor speed within a PMG rotor speed operating range. A PMG may be coupled to an engine and comprise a part of an Electrical Power Generating System (EPGS) and may be in electronic communication with one or more Power Management and Distribution units (PMAD) comprising a multifunction controller. In this regard, the PMAD may optimize engine efficiency and electrical output.

With reference to FIG. 1, a schematic view of a Tactical Quiet Generator (TQG) 100 is illustrated in accordance with various embodiments. TQG 100 may include a TQG controller 104, a More Electric Engine (MEE) 102, an output supply system 200, and various loads such as a DC microgrid 116, a load 118, an Environmental Conditioning System (ECS) compressor 120 load, and an export Alternating Current (AC) power 122 load. In various embodiments, TQG controller 104 may perform supervisory functions over and provide a user interface to TQG components. In various embodiments, MEE 102 is coupled to output supply system 200 which may comprise a PMG or Permanent Magnet Synchronous Machine (PMSM). In various embodiments, MEE 102 may comprise an engine 112. In various embodiments, engine 112 may be a gas turbine engine, or a diesel engine, or any engine suitable for rotating a PMG or PMSM. In various embodiments, the MEE 102 may further comprise a fuel system 106, a lubrication system 108, a cooling system 110 and a MEE PMAD 114.

In various embodiments, MEE PMAD 114 is in electronic communication with TQG controller 104, fuel system 106, lubrication system 108, cooling system 110 and output supply system 200. MEE PMAD 114 may comprise an isolated dc/dc converter to supply 28 Vdc power to fuel system 106 transfer fuel pumps, injection pumps, solenoid controls, and the like. In various embodiments, MEE PMAD 114 may comprise a High Voltage Direct Current (HVDC) bus to provide power to lubrication system 108 and cooling system 110. In various embodiments, the MEE PMAD 114 HVDC bus may supply power to an inverter comprising a fan inverter or a cooling pump inverter of cooling system 110 and the MEE PMAD 114 HVDC bus may supply power to an inverter comprising an oil pump inverter of lubrication system 108.

Figure 2:
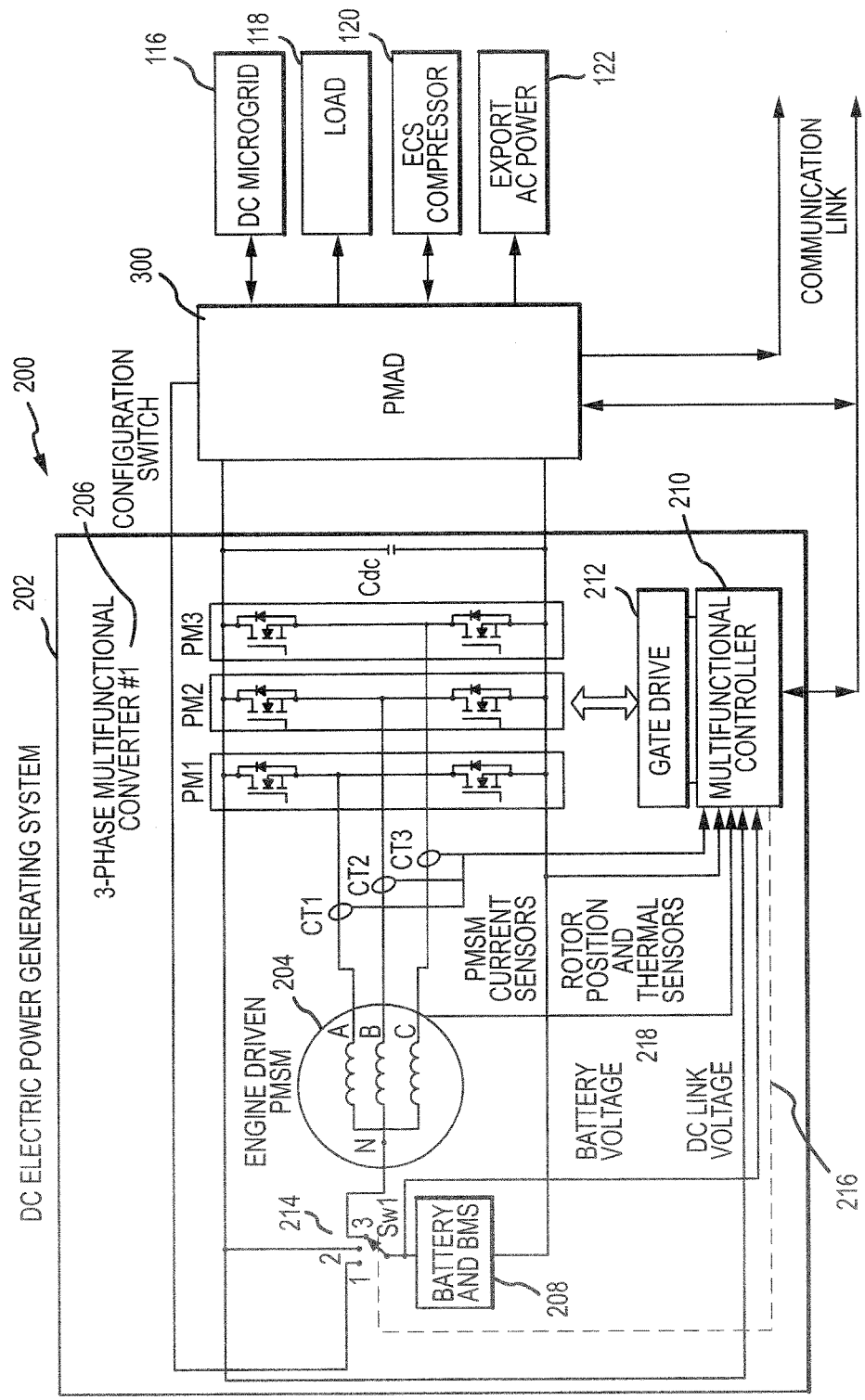
FIG. 2 illustrates a schematic view of an output supply system, in accordance with various embodiments.

In various embodiments, and with reference to FIGS. 1 and 2, an output supply system 200 is illustrated and may comprise an EPGS 202. EPGS 202 may comprise an engine driven PMSM 204 which may generate electric power in response to rotation of an output shaft of diesel engine 112. In various embodiments, PMSM 204 may be configured to output a first single-phase voltage, a second single-phase voltage, and a third single-phase voltage to a first three-phase multifunction converter 206 comprising transistors. In various embodiments, a three-phase multifunction converter, such as first three-phase multifunction converter 206, may comprise a plurality of transistors and diodes, such as six transistors and six diodes for example. The plurality of transistors may comprise one or more insulated-gate bipolar transistors (IGBTs) and/or metal-oxide semiconductor field-effect transistors (MOSFETs).

EPGS 202 is in electronic communication with PMAD 300 and may further comprise a battery and Battery Management System (BMS) 208 and a controller 210 having a gate drive 212 in electronic communication with the first three-phase multifunction converter 206. In various embodiments, controller 210 may comprise a processor or tangible, non-transitory memory and may be configured to implement various logical operations in response to execution of instructions, for example, instructions stored on a non-transitory, tangible, computer-readable medium. The EPGS may further comprise a first three-position switch 214 coupled to the PMSM 204 neutral and in electronic communication with the BMS 208, the PMSM 204, the first three-phase multifunction converter 206, the controller 210, and a second three-position switch, such as second three-position switch 308 of FIG. 3.

Figure 3:
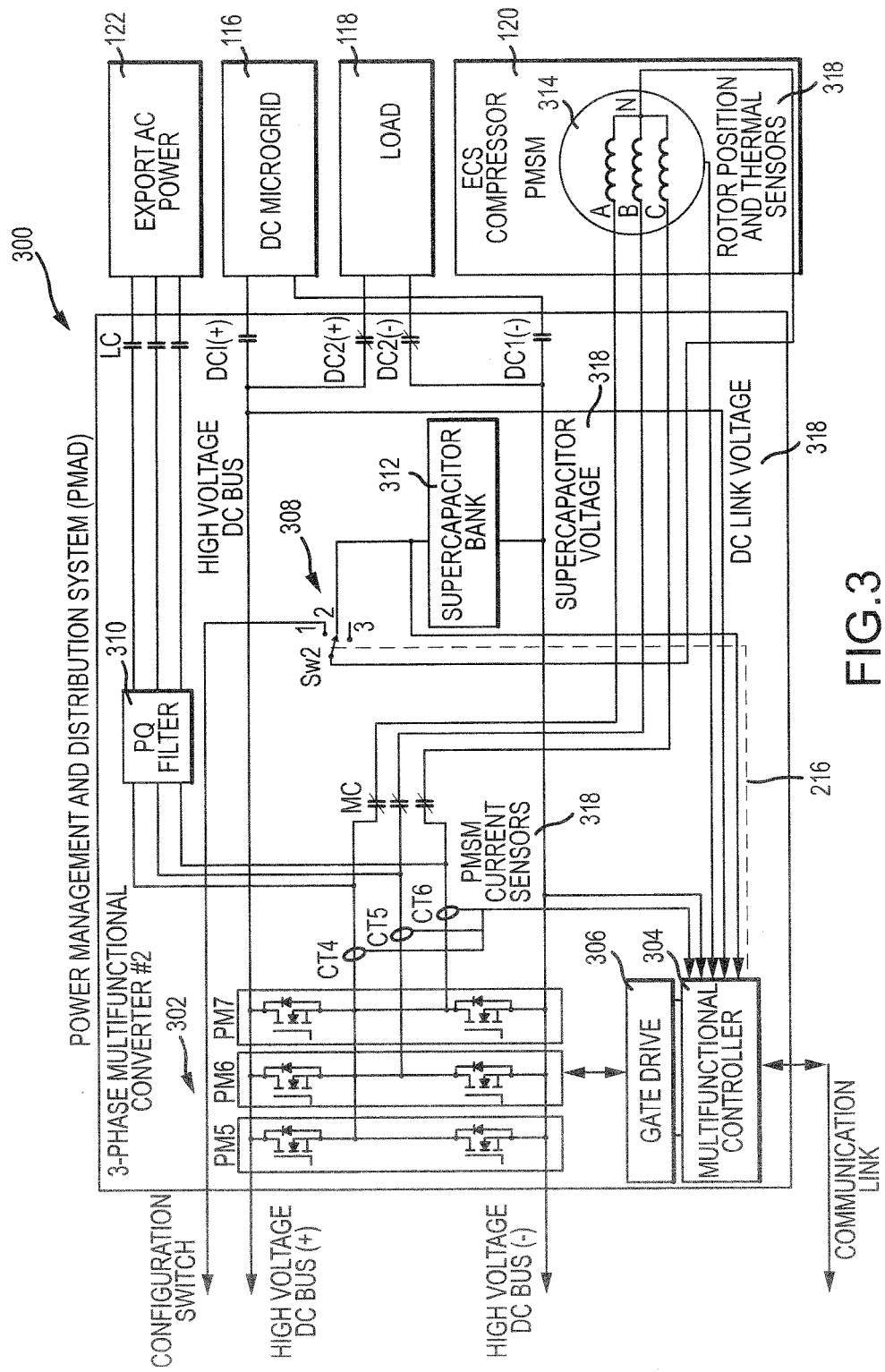
FIG. 3 illustrates a schematic view of a Power Management and Distribution system, in accordance with various embodiments.

In various embodiments, and with reference to FIGS. 1 through 3, a Power Management and Distribution System (PMAD) 300 is illustrated. PMAD 300 may comprise a second three-phase multifunction converter 302, similar in manufacture to first three-phase multifunction converter 206, and a second three-position switch 308. PMAD 300 may further comprise a PQ filter 310, a supercapacitor bank 312, and a controller 304 having a gate drive 306 in electronic communication with second three-phase multifunction converter 302. In various embodiments, PQ filter 310 may improve the power quality of AC power supplied to AC power 122 load. In various embodiments, ECS compressor 120 load may comprise a second PMSM 314 and second three-position switch 308 may be coupled to a neutral of second PMSM 314. In various embodiments, second three-position switch 308 may be in electronic communication with first three-position switch 214, supercapacitor bank 312, second three-phase multifunction converter 302, controller 304, and ECS compressor 120 load. In various embodiments, controller 304 may comprise a processor and may be configured to implement various logical operations in response to execution of instructions, for example, instructions stored on a non-transitory, tangible, computer-readable medium.

In various embodiments, output supply system 200 may have selectable operational modes. In various embodiments, an operational mode of the output supply system may be as a 3-channel interleaved dc/dc buck/boost converter (a "DC bus stabilization mode"), a silent mode, an engine start or engine assist mode, an active rectification mode, an ECS power supply mode, a DC microgrid power supply mode, or an AC power supply mode. In various embodiments, several DC bus stabilization modes may be selected in order to stabilize voltage on a dc bus during a rapid loading application such as, for example, a pulse load from a laser or a supercapacitor bank or from interconnecting a plurality of TQGs. In various embodiments, an output supply system may provide an active damping mode using feedback loops to stabilize the active rectifier or dc/dc converter when connected to a constant power load, or may provide a droop control mode to reduce the dc voltage reference with increasing output. In various embodiments, start mode may draw power from batteries such as, for example, BMS 208 to provide cranking energy for an engine such as diesel engine 112. In various embodiments, a silent mode may provide dc bus power from batteries such as, for example, BMS 208 while the state of the engine is off.

In various embodiments, output supply system 200 may be switched between operating modes in response to an engine state, a position of the first three-position switch 214, a position of the second three-position switch 308, a configuration of the first three-phase multifunction converter 206, and a configuration of the second three-phase multifunction converter 302 as described in TABLE 1 below. In TABLE 1, the "Operational Mode" column indicates the operational mode of output supply system 200 for the given system element's setting indicated in the respective column along the corresponding row, the "Engine State" column indicates the engine state of engine 112, the "1st 3-phase multifunction converter configuration" column indicates the configuration of first three-phase multifunction converter 206, the "1st 3-position switch position" column indicates which of the first, second, or third positions of the first three-position switch 214 are open or closed, the "2nd 3-phase multifunction converter configuration" column indicates the configuration of second three-phase multifunction converter 302, and the "2nd 3-position switch position" column indicates which of the first, second, or third positions of the second three-position switch 308 are open or closed. For example, reading from right to left, when the output supply system 200 is switched to the "silent" mode: engine 112 is off, first three-phase multifunction converter 206 is configured as a dc/dc converter, the third position of the first three-position switch 214 is closed while the first and second positions are open, the second three-phase multifunction converter 302 is configured as a PWM inverter, and the third position of the second three-position switch 308 is closed while the first and second positions are open.

sensors 218 of FIG. 2 or sensors 318 of FIG. 3. In various embodiments, sensor inputs may be a voltage, a current, a PMSM rotor position, a shaft speed, a temperature, or any other measurement know to those skilled in the art. In various embodiments, the first three-phase multifunction converter 206 and the second three-phase multifunction converter 302 may be configured, respectively, by a controller in response to an input from gate drive 212 and an input from gate drive 306. In various embodiments, the first three-position switch 214 and the second three-position switch 308 may open or close a position in response to a switch control signal 216 from a controller such as controller 210 or controller 304.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be

TABLE 1

OUTPUT SUPPLY SYSTEM OPERATIONAL MODE CONFIGURATIONS

| Operational Mode | Engine State | 1st 3-phase multifunction converter configuration | 1st 3-position switch postion | | | 2nd 3-phase multifunction converter configuration | 2nd 3-position switch position | | |
|---|---|---|---|---|---|---|---|---|---|
| | | | 1 | 2 | 3 | | 1 | 2 | 3 |
| Start/Engine Assist | on | PWM Inverter | open | closed | open | Any | any | any | any |
| Active Rectification | on | PWM Converter | open | closed | open | Any | any | any | any |
| Silent | off | DC/DC Converter | open | open | closed | PWM Inverter | open | open | closed |
| DC bus stabilization mode 1 | off | DC/DC Converter | open | open | closed | Any | any | any | any |
| DC bus stabilization mode 2 | on | DC/DC Converter | open | open | closed | DC/DC Converter | open | closed | open |
| DC bus stabilization mode 3 | on | PWM Converter | closed | open | open | DC/DC Converter | closed | open | open |
| ECS power supply | on | PWM Converter | open | closed | open | PWM Inverter | open | open | closed |
| DC microgrid power supply | on | PWM Converter | closed | open | open | DC/DC Converter | open | open | closed |
| AC power supply | on | PWM Converter | open | closed | open | PWM Inverter | any | any | any |

In various embodiments, a three-phase multifunction converter may be configured as pulse width modulated (PWM) bidirectional active rectifier having a field oriented control. In various embodiments, a three-phase multifunction converter may be configured as a 3-channel interleaved dc/dc boost converter or as a dc/ac inverter. In various embodiments, interleaving may involve parallel connection of three channels of boost converters and phase shifting the PWM switching frequency by 120° between channels. In various embodiments, a PMSM stator's windings may be used as inductors for each boost converter channel.

In various embodiments, controller 210 and controller 304 may be an integrated controller. In various embodiments, a controller may command an operational mode in response to a parameter such as, for example, a change in load such as, for example, load 118 or AC power 122 load, or a parameter such as change in an engine output shaft speed, or information or an instruction from the TQG controller 104. In various embodiments, the information or instruction issued by the TQG controller 104 may be of the form "start" or "silent." In various embodiments, a controller may derive a parameter from a sensor input, such as from limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An Output Supply System (OSS) comprising:
an Electric Power Generating System (EPGS), comprising;
a first Permanent Magnet Synchronous Machine (PMSM);
a first three-phase multifunction converter;
a first three-position switch;
a battery management system, wherein the PMSM, the first three-phase multifunction converter, the first three-position switch, and the battery management system are in electronic communication; and
a first tangible, non-transitory memory configured to communicate with a first controller, the first tangible, non-transitory memory having instructions stored thereon that, in response to execution by the first controller, cause the first controller to perform operations comprising:
receiving, by the first controller, at least one of an input from a first sensor or a first parameter;
determining, by the first controller, a second parameter based on the input of the first sensor;
selecting, by the first controller, a first configuration of the first three-phase multifunction converter and a position of the first three-position switch in response to at least one of the first parameter or the second parameter; and
commanding, by the first controller, the first three-position switch to at least one of a first position, a second position, or a third position and commanding the first configuration of the first three-phase multifunction converter.

2. The OSS of claim 1, wherein the second parameter is at least one of a change in voltage, a change in current, a change in temperature, a change in a shaft speed, or a battery capacity.

3. The OSS of claim 2 wherein the first configuration of the first three-phase multifunction converter is one of a pulse width modulated (PWM) inverter, a PWM converter, or a dc/dc converter.

4. The OSS of claim 3, wherein the first three-position switch is coupled to a neutral of the first PMSM.

5. The OSS of claim 4, wherein the first controller further comprises a gate drive.

6. The OSS of claim 5 further comprising a Power Management and Distribution System (PMAD) in electronic communication with the EPGS, the PMAD comprising: a second three-phase multifunction converter, a second three-position switch, a PQ filter, a supercapacitor bank, wherein the second three-phase multifunction converter, the second three-position switch, the PQ filter, and the supercapacitor bank are in electronic communication, and a second tangible, non-transitory memory configured to communicate with a second controller, the second tangible, non-transitory memory having instructions stored thereon that, in response to execution by the second controller, cause the second controller to perform operations comprising:
receiving, by the second controller, at least one of an input from a second sensor or the first parameter;
determining, by the second controller, a third parameter based on the input of the second sensor;
selecting, by the second controller, a second configuration of the second three-phase multifunction converter and a position of the second three-position switch in response to at least one of the first parameter or the third parameter; and
commanding, by the second controller, the second three-position switch to at least one of a first position, a second position, or a third position and commanding the second configuration of the first three-phase multifunction converter.

7. The OSS of claim 6, wherein the PMAD is in electronic communication with one of an AC power load, a load, a DC microgrid, or an Environmental Conditioning System (ECS) compressor load.

8. The OSS of claim 7, wherein the ECS compressor load comprises a second PMSM.

9. The OSS of claim 8, wherein the second three-position switch is coupled to a neutral of the second PMSM.

10. The OSS of claim 9, wherein the third parameter is one of a change in voltage, a change in current, a change in temperature, a change in a shaft speed, a supercapacitor capacity, or a load.

11. The OSS of claim 10, wherein the first parameter is an output from one of the first controller, the second controller, or a third controller.

12. The OSS of claim 11, wherein the second configuration of the second three-phase multifunction converter is one of a PWM inverter, a PWM converter, or the dc/dc converter.

13. A Tactical Quiet Generator (TQG) comprising:
an engine having an output shaft,
a TQG controller in electronic communication with the engine,
and an Output Supply System (OSS) in electronic communication with the TQG controller comprising: an EPGS comprising; a first PMSM coupled to the output shaft, a first three-phase multifunction converter, a first three-position switch, and a battery management system, wherein the first PMSM, the first three-phase multifunction converter, first three-position switch, and the battery management system are in electronic communication;
a PMAD comprising; a second three-phase multifunction converter, a second three-position switch, a PQ filter, and a supercapacitor bank, wherein the second three-phase multifunction converter, the second three-position switch, the PQ filter, and the supercapacitor bank are in electronic communication; wherein the EPGS and the PMAD are in electronic communication, and
a tangible, non-transitory memory configured to communicate with an OSS controller, the tangible, non-transitory memory having instructions stored thereon that, in response to execution by the OSS controller, cause the OSS controller to perform operations comprising:
receiving, by the OSS controller, at least one of an input from a first sensor or a first parameter;
determining, by the OSS controller, a second parameter based on the input of the first sensor;
selecting, by the OSS controller, a first configuration of the first three-phase multifunction converter and a position of the first three-position switch in response to at least one of the first parameter or the second parameter; and
commanding, by the OSS controller, the first three-position switch to at least one of a first position, a second position, or a third position and commanding the first configuration of the first three-phase multifunction converter.

14. The TQG of claim 13, wherein the operations further comprise selecting, by the OSS controller, a second configuration of the second three-phase multifunction converter and a position of the second three-position switch in response to at least one of the first parameter or the second parameter; and commanding, by the OSS controller, the second three-position switch to at least one of a first position, a second position, or a third position and commanding the second configuration of the second three-phase multifunction converter.

15. The TQG of claim 14, wherein the second parameter is at least one of a change in voltage, a change in current, a change in temperature, a change in a shaft speed, a supercapacitor capacity, a battery capacity, or a load.

16. The TQG of claim 15, wherein the first parameter is an output from at least one of the TQG controller or a third controller.

17. The TQG of claim 16, wherein an operational mode of the OSS is determined in response to the commanding, by the OSS controller, the first three-position switch to at least one of a first position, a second position, or a third position and commanding the first configuration of the first three-phase multifunction converter and the commanding, by the OSS controller, the second three-position switch to at least one of a first position, a second position, or a third position and commanding the second configuration of the second three-phase multifunction converter.

18. The TQG of claim 17, wherein the operational mode of the OSS is at least one of an engine start or engine assist mode, an active rectification mode, a silent mode, a first DC bus stabilization mode, a second DC bus stabilization mode, a third DC bus stabilization mode, an ECS power supply mode, a DC microgrid power supply mode, or an AC power supply mode.

19. An article of manufacture including a tangible, non-transitory computer-readable storage medium having instructions stored thereon that, in response to execution by a processor, cause the processor to perform operations comprising:

receiving, by the processor, at least one of an input from a first sensor or a first parameter;

determining, by the processor, a second parameter based on the input of the first sensor;

selecting, by the processor, a first configuration of a first three-phase multifunction converter and a position of a first three-position switch in response to at least one of the first parameter or the second parameter; and commanding, by the processor, the first three-position switch to at least one of a first position, a second position, or a third position and commanding the first configuration of the first three-phase multifunction converter.

20. The article of manufacture of claim 19, further comprising the operation of selecting, by the processor, a second configuration of a second three-phase multifunction converter and a position of a second three-position switch in response to at least one of the first parameter or the second parameter; and commanding, by the processor, the second three-position switch to at least one of a first position, a second position, or a third position and commanding the second configuration of the second three-phase multifunction converter.

* * * * *